May 13, 1952     J. T. JORDAN     2,596,692
METHOD OF ABSORBING GASES, INCLUDING HYDROGEN SULFIDE
Filed Oct. 29, 1946
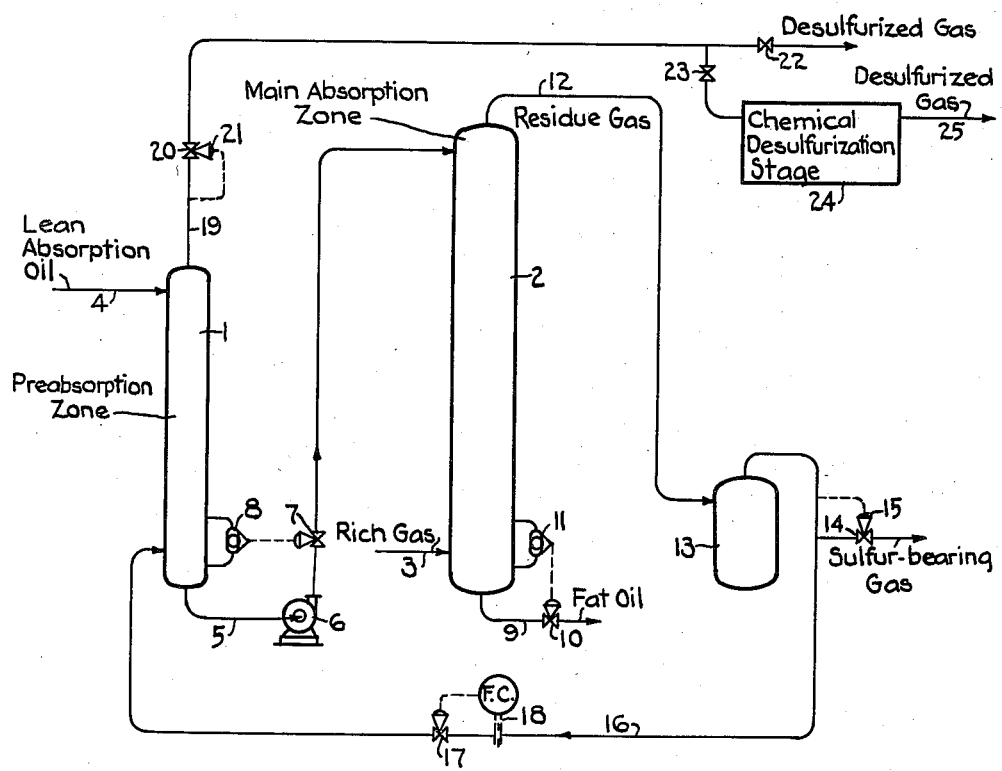
Inventor: John Thomas Jordan
By his Attorney:

Patented May 13, 1952

2,596,692

UNITED STATES PATENT OFFICE 2,596,692

METHOD OF ABSORBING GASES, INCLUDING HYDROGEN SULFIDE

John Thomas Jordan, Houston, Tex., assignor to Shell Development Company, Emeryville, Calif., a corporation of Delaware Application October 29, 1946, Serial No. 706,344

7 Claims. (Cl. 183—115)

This invention relates to the separation of gaseous hydrocarbon mixtures containing sulfur compounds into fractions by absorption.

It is conventional to recover gasoline constituents from the production of gas condensate wells and crude oil wells by contacting gaseous mixture containing gasoline constituents with an absorption oil to dissolve constituents in the gasoline boiling range and subsequently removing the constituents in the gasoline boiling range from the absorption oil by distillation. When such gaseous mixture contains volatile sulfur compounds like H₂S these are present in the residue gas. In many situations it is desired to use a small portion of such residual gas substantially freed from sulfur compounds. One such use is as fuel for a gas engine used in connection with the absorption plant, although it may be utilized for other purposes. This requirement has in the past necessitated the use of a separate desulfurization step.

It is an object of the present invention to arrange a system for removing such objectionable sulfur compounds from a small portion of the residue gas by the use of the absorption oil employed to recover gasoline constituents. A further object of the present invention is to provide a method whereby the chemical desulfurization step for such small portion of the residue gas may be eliminated, or in which the load on the equipment used in such desulfurization step is substantially reduced, resulting, in either case, in a considerable saving in capital and operating cost.

Other advantages of the present invention will be evident from the following detailed description, taken together with the annexed drawing in which the sole figure is a schematic diagram of a preferred method for practicing the invention.

I have found that a small portion of the residue gas discharged from the main absorption zone of a gasoline cycling or absorption plant can be advantageously desulfurized by contacting it in a preabsorption zone with a major portion of the lean absorption oil prior to the injection of such oil into the main absorption zone. While I prefer to use all of the lean absorption oil in the preabsorber, it is possible to use a smaller quantity, such as half of such oil, particularly when the residue gas treated is low in sulfur content or when only a very small portion of such residue gas is treated in the preabsorption zone. In the usual case, from about 2% to about 15% of the residue is thus treated.

The degree of desulfurization attainable by my method depends upon the operating conditions, the ratio of the flows of absorption oil and residue gas in the preabsorption zone and the sulfur content of the residue gas. When such residue gas is treated for use as gas engine fuel it is usually desirable to purify it to reduce its H₂S content to below 20 gr. (grains) per 100 S. C. F. (standard cubic feet). Under the typical operating conditions described hereinafter this result may be achieved when the residue gas contains not over about 300 gr. of H₂S per 100 S. C. F. When the residue gas contains of the order of 30 gr. of H₂S per 100 S. C. F., it is feasible to produce a purified gas containing less than 5 gr. of H₂S per 100 S. C. F. In such cases the need for a separate H₂S removal unit is entirely eliminated at a considerable saving in capital and operating cost. The preferred application of my method is, therefore, in the treatment of residue gas containing 30 to 300 gr. of H₂S per 100 S. C. F.

When the residue gas contains higher concentrations of H₂S a separate H₂S removal unit may still be necessary. The use of my method, however, reduces the load on such unit, permitting a reduction in the size of the unit and a saving in operating costs. This saving is significant at high concentrations of H₂S in the residue gas, e. g., from 3000 to 6000 gr. per 100 S. C. F.

Some of the residue gas treated in the preabsorption zone is dissolved in the lean absorption oil together with the H₂S and the rate of flow of residue gas into this zone must be regulated with this in view. The fraction dissolved consists predominantly of propane and ethane and may in typical operations amount to 20% to 50% of the feed to the preabsorption zone, the exact amount being dependent upon operating conditions, such as the ratio of absorption oil to residue gas, the pressure and the temperature. This absorption of propane and ethane in the lean absorption oil is advantageous in the main absorption zone in that it facilitates the control of the temperature and reduces absorption of propane and ethane.

In the drawing, 1 and 2 are absorption zones suitable for the countercurrent contacting of liquid and vapor under pressure. A rich gas, such as that produced by a condensate well or a gaseous fraction from a crude oil well containing H₂S is fed through line 3 into the bottom portion of the main absorber 2. A lean absorption oil is injected under pressure through line 4 into upper portion of the preabsorption zone 1 and withdrawn at the bottom by means of line 5 and booster pump 6 at a rate controlled by valve 7 and liquid level controller 8. It is injected into the top of the main absorption zone 2 in which it absorbs constituents in the gasoline boiling range. The fat absorption oil is withdrawn at the bottom through line 9 under control of valve 10 and liquid level controller 11. From there it may be passed through the conventional flash drums and stripping units for the separation of the absorbed gasoline constituents from the absorption oil.

The unabsorbed gas, herein designated as residue gas, is withdrawn at the top of the main absorption zone 2 via line 12 and surge tank 13. Most of the H₂S and other volatile sulfur compounds introduced with the rich gas find their way into the residue gas. The bulk of this sulfur-bearing gas is withdrawn from the system via valve 14, controlled by back pressure regulator 15. A small portion of the residue gas, normally between 2 and 15%, is flowed via line 16 at a rate controlled by valve 17 and flow gauge 18 and is introduced into the bottom of the preabsorption zone 1, which, in the illustrated embodiment, is operated at a slightly lower pressure than the main absorption zone, but may be operated at the same or even at a higher pressure by use of a compressor.

In the preabsorption zone a comparatively small volume of gas is scrubbed with the lean absorption oil resulting in the absorption of H₂S, together with some of the residue gas introduced. The scrubbed gas is withdrawn at the top via line 19 and valve 20 controlled by back pressure regulator 21. When operating on a rich gas feed having a relatively low sulfur content the gas withdrawn from the top of the preabsorption zone 1 will usually be adequately desulfurized and may be withdrawn from the process via valve 22. When, however, the rich gas has a high concentration of sulfur compounds it may still be necessary to subject the gas to a chemical desulfurization step, such as the usual phosphate treater. In this alternative the valve 22 is closed and the scrubbed gas is instead passed through valve 23 into a chemical desulfurization stage 24 and withdrawn from the process at 25.

I have found that the process may be successfully carried out at customary absorption temperature and pressure conditions. It is desirable to operate at high pressures, even above those indicated in the following example, although effective desulfurization may be effected at pressures as low as 50 lbs. per square inch.

The absorption zones may consist of any apparatus suitable for the contacting of liquid and vapor phases, preferably in countercurrent, although it is usually not necessary that the preabsorption zone provide as many bubble trays as the main absorption zone. By way of illustration, the main absorption zone may have 20 to 30 trays or plates, and the preabsorption zone may have 10 to 15 such plates or equivalent stages.

The application of the above described process may be illustrated by the following example: Using a 15-plate preabsorption zone 1 and a 25-plate main absorption zone 2, a natural gas containing about 100 gr. of H₂S per 100 s. c. f. of gas is fed at 200 lbs. per square inch through line 3. Absorption oil of kerosene boiling range is flowed through lines 4 at a rate corresponding approximately to 1 gallon of absorption oil to 56 s. c. f. of rich gas, and the temperature is maintained at 100° F. Under these conditions about 85% of the butane and almost all of the heavier constituents of the gas are absorbed. 8% of the residue gas is flowed through valve 17, resulting in a gas to oil ratio in the preabsorption zone 1 of about 4.5 s. c. f of gas per gallon of absorption oil. The preabsorption zone is operated at 100° F. and pressure of 190 lbs. per square inch. About 90% of the H₂S and part of the residue gas is thereby absorbed in the absorption column. Desulfurized gas, amounting to 5% of the gas withdrawn through line 12, is obtained as a product.

I claim as my invention:

1. A process for separating a gas containing a mixture of hydrocarbons and non-hydrocarbon impurities, comprising the steps of passing said gas in the vapor phase and under pressure into contact with an absorption oil containing the impurities in a main absorption zone to absorb a fraction of said hydrocarbons and produce a fat absorption oil, separating the resulting fat absorption oil from the unabsorbed vapor phase, passing a small portion only of said separated vapor phase under pressure into contact with a lean absorption oil in a preabsorption one to absorb impurities therein, separating the purified unabsorbed vapor phase from the resulting solution of impurities in absorption oil, and utilizing the said solution as the absorption oil in the main absorption zone.

2. A process of separating liquefiable hydrocarbons from hydrocarbon gas mixtures containing H₂S, comprising the steps of passing said hydrocarbon mixture in the vapor phase and under pressure into contact with an absorption oil containing H₂S in a main absorption zone to absorb said liquefiable hydrocarbons and produce a fat absorption oil, separating the resulting fat absorption oil from the unabsorbed vapor phase, passing a small portion only of said separated vapor phase under pressure into contact with a lean absorption oil in a preabsorption zone to absorb H₂S therein, separating the desulfurized vapor phase from the resulting solution of H₂S in absorption oil, and utilizing the said resulting solution as the absorption oil in the main absorption zone.

3. In a process of absorbing liquefiable hydrocarbons from a hydrocarbon gas mixture containing H₂S, the steps of absorbing liquefiable hydrocarbons from said mixture by passing it in the vapor phase under pressure in a main absorption zone countercurrently to a liquid absorption oil, separating the resulting fat absorption oil and residue gas containing H₂S, removing H₂S from a small portion only of the separated residue gas by passing said portion separately in the vapor phase under pressure in a preabsorption countercurrently to substantially all of the liquid absorption oil prior to its use in the main absorption zone, separating the resulting solution of H₂S in absorption oil and desulfurized vapor phase, and using the separated solution of H₂S in absorption oil as the absorption oil in the main absorption zone.

4. The process according to claim 3 in which between 2% and 15% of the separated residue gas is treated in the preabsorption zone.

5. In a process of separating an initial hydrocarbon gas mixture containing H₂S, and gaseous and liquefiable hydrocarbons into a fraction (a) rich in hydrocarbons suitable for use as gasoline, a relatively large gaseous fraction (b) containing most of the H₂S, and a relatively small gaseous fraction (c) having a low H₂S content, the steps of passing said gas mixture under a pressure in excess of 50 pounds per square inch in a main absorption zone countercurrently to an absorption oil to produce a fat absorption oil containing the fraction (a) in solution and residue gas containing H2S, separating between 85% and 98% of the residue gas as fraction (b), separately passing the remaining portion of said residue gas under a pressure in excess of 50 pounds per square inch in a preabsorption zone countercurrently to an absorption oil in a quantity substantially the same as that used in the main absorption zone, to produce a solution of H2S in the absorption oil and the gaseous fraction (c), and utilizing said resulting solution as the absorption oil in the main absorption zone.

6. The process according to claim 5 in which the residue gas contains between 30 and 300 grains of H2S per 100 standard cubic feet of gas, and the fraction (c) contains less than 20 grains of H2S per 100 standard cubic feet of gas.

7. In a process of separating an initial hydrocarbon gas mixture containing only a small proportion of H2S as impurity, and gaseous and liquefiable hydrocarbons into a fraction (a) rich in hydrocarbons suitable for use as gasoline, a relatively large residue gaseous fraction (b) containing most of the H2S in the initial gas mixture in a concentration between 30 and 300 grains of H2S per 100 standard cubic feet of gas, and a relatively small desulfurized gaseous fraction (c) having a low H2S content less than 20 grains of H2S per 100 standard cubic feet of gas, the combination of steps of passing said initial gas mixture under a pressure in excess of 50 pounds per square inch at a temperature of about 100° F. in a main absorption zone countercurrently to hydrocarbon absorption oil of kerosene boiling range containing H2S absorbed in a previous absorption step from a preceding portion of a residue gaseous fraction (b) to produce a fat absorption oil containing the fraction (a) in solution and residue gas containing H2S in a concentration between 30 and 300 grains of H2S per 100 standard cubic feet of gas, separating between 85% and 98% of the resulting unabsorbed gaseous product as product fraction (b) from the remaining 2% to 15% of unabsorbed gaseous product, passing only the 2% to 15% of unabsorbed gaseous product under a pressure in excess of 50 pounds per square inch at a temperature of about 100° F. in a preabsorption zone countercurrently to an absorption oil in a quantity and of a constitution substantially the same as that used in the main absorption zone and such as to produce a solution of H2S in the absorption oil and the gaseous fraction (c) containing less than 20 grains of H2S per 100 standard cubic feet of gas, and utilizing the resulting solution as the absorption oil in the main absorption zone.

JOHN THOMAS JORDAN.

REFERENCES CITED

The following references are of record in the file of this patent:

UNITED STATES PATENTS

| Number | Name | Date |
| --- | --- | --- |
| 1,936,570 | Bragg | Nov. 28, 1933 |
| 1,987,267 | Ragatz | Jan. 8, 1935 |
| 2,318,752 | Carney | May 11, 1943 |

OTHER REFERENCES

Bureau of Mines Technical Paper 310, "Recovery of Gasoline from Uncondensed Still Vapors," by D. B. Dow, 1923.